(No Model.) 2 Sheets—Sheet 1.

N. C. ORRICK.
HARROW OR CULTIVATOR.

No. 352,998. Patented Nov. 23, 1886.

Witnesses
Inventor,
Nicholas C. Orrick,
By his Attorneys (No Model.) 2 Sheets—Sheet 2.
N. C. ORRICK.
HARROW OR CULTIVATOR.
No. 352,998. Patented Nov. 23, 1886.
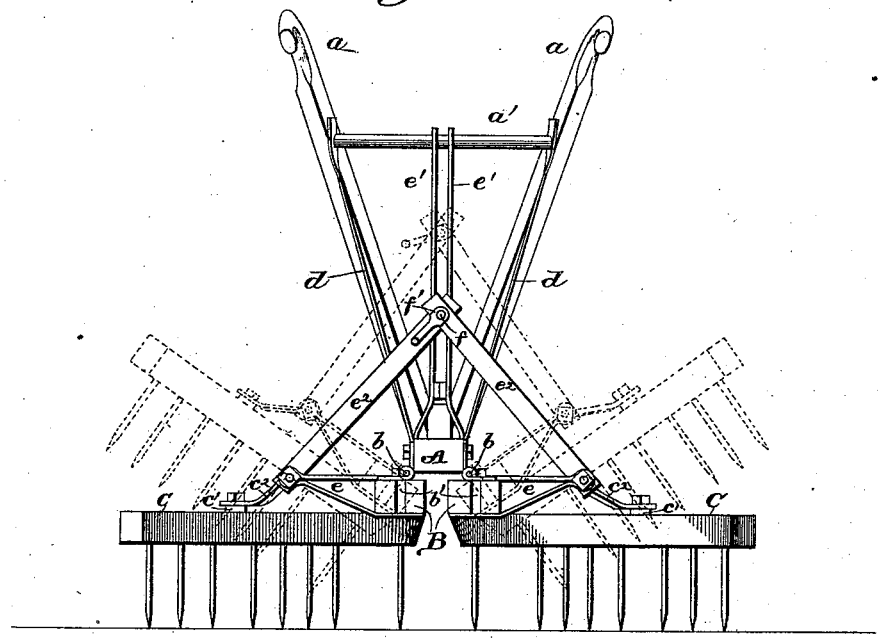
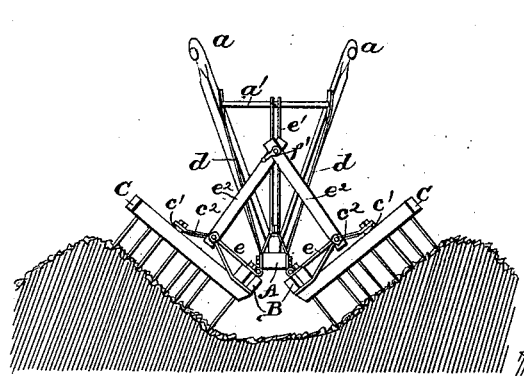
Witnesses
Percy C. Bowen
E. G. Siggers
Inventor,
Nicholas C. Orrick;
By his Attorneys

UNITED STATES PATENT OFFICE.

NICHOLAS CROMWELL ORRICK, OF CANTON, MISSISSIPPI.

HARROW OR CULTIVATOR.

SPECIFICATION forming part of Letters Patent No. 352,998, dated November 23, 1886.

Application filed July 9, 1886. Serial No. 207,596. (No model.)

*To all whom it may concern:*

Be it known that I, NICHOLAS CROMWELL ORRICK, a citizen of the United States, residing at Canton, in the county of Madison and State of Mississippi, have invented a new and useful Improvement in Harrows or Cultivators, of which the following is a specification.

My invention relates to harrows or cultivators, particularly such as are used in cultivating in the bed and ridge systems of agriculture.

It is customary in certain classes of agriculture to lay out the ground in alternating ridges and beds. In harrowing or cultivating this ground a plain flat harrow is useless, because it will break down the ridges.

The object of my invention is to produce a harrow which shall be capable of working both upon the ridges and in the beds and in either instance to preserve the form of the ground.

To this purpose my invention consists in a harrow the teeth-bars of which are capable of both horizontal and vertical adjustment, as hereinafter described and claimed.

My invention further consists in certain peculiar and novel features of construction and arrangement, as hereinafter set forth.

In order that my invention may be fully understood, I will proceed to describe it with reference to the accompanying drawings, in which—

Figure 1:
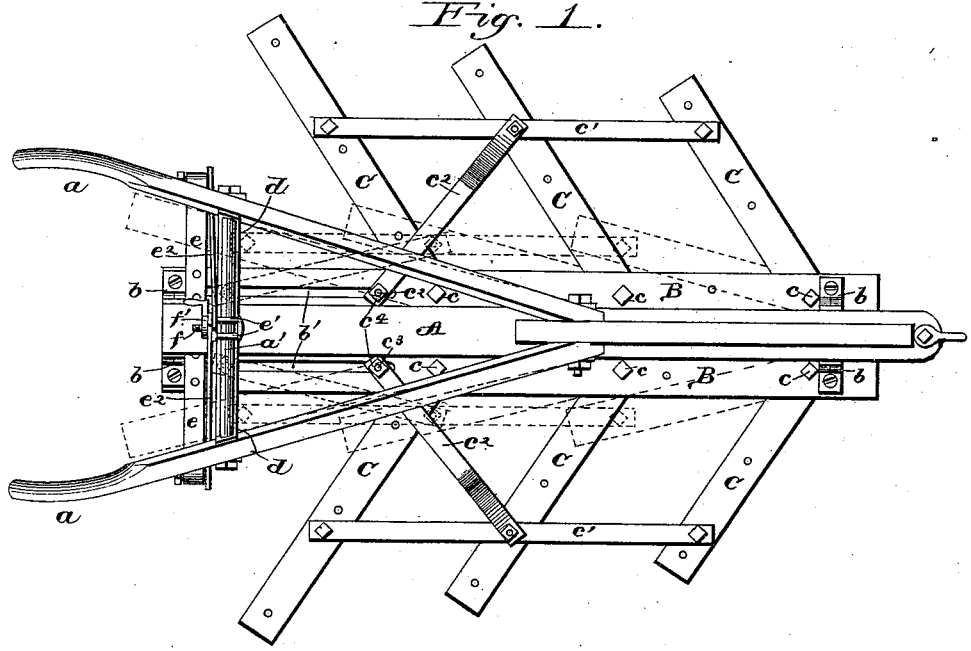
Figure 3:
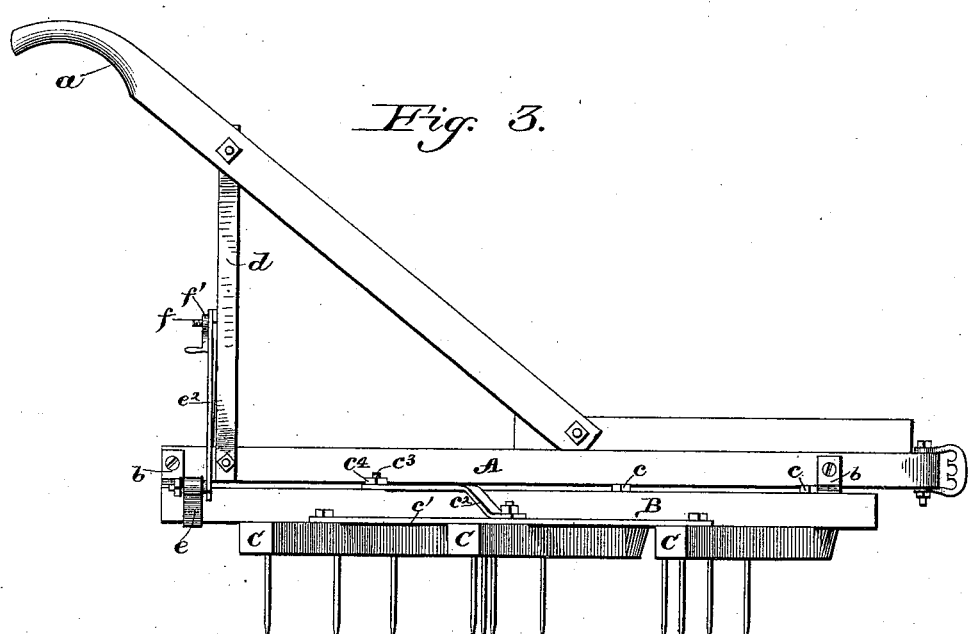

Figure 1 is a plan view of my improved harrow or cultivator. Fig. 2 is a rear elevation of the same. Fig. 3 is a side elevation of the same. Fig. 4 illustrates a portion of ridge and bed land with my improved harrow working upon the ridge. Fig. 5 is a similar view showing the harrow working on the bed.

In the said drawings, A represents the central beam, forming the harrow or cultivator-frame.

$a$ $a$ designate the handles, which diverge upwardly and rearwardly from the beam A, in the usual manner.

B B designate two beams extending along either side of the central beam, A, and connected thereto by hinges $b$. Each of these bars B carries a number (three being shown) of teeth-bars, C, which are pivoted at their inner ends to the bars B, as shown at $c$. The bars B carry suitable harrow or cultivator teeth in any preferred manner. The teeth-bars C of each set are arranged at an angle to the side beams, B, and they are connected together by a bar, $c'$, and a link, $c^2$, connects the bars of each set with a corresponding side bar, B. Said link $c^2$ has a bolt, $c^3$, which works in a slot, $b'$, formed longitudinally in each beam B. A nut, $c^4$, screws upon the bolt $c^3$, and by tightening said nut the link will be rigidly connected to the corresponding side beam at any desired point in the slot. Thus it will be seen that the sets of teeth-bars may be moved forward or backward of the harrow, and thus the width of the harrow may be increased or decreased, to correspond with either the width of the ridge or the width of the bed.

$d$ $d$ designate two bars extending upward from the transverse beam A, and connected at their upper ends to the handles $a$. A bar, $a'$, extends horizontally between the handles, and midway of the length of said bar are connected the upper ends of two bars, $e'$, the lower ends of which are connected to the central beam, $a$. These bars $e'$ are only slightly separated from each other, so as to form guides, for a purpose to be presently explained.

Each of the side beams, B, is provided at its rear end with an outwardly-extending bracket, $e$, to the outer end of which is pivoted a link, $e^2$, said links being pivoted at their lower ends to the brackets $e$, and at their upper ends to a bolt, $f$, which works between the two bars $e'$. A nut, $f'$, screws upon the bolt $f$, and serves to bind the bolt in any desired position between the bars $e'$ by acting against the head of the bolt. It will thus be seen that the sets of teeth-bars may also be adjusted vertically in such manner that their outer ends shall be either above or below the horizontal plane. This is done by loosening the nut $f'$, adjusting the bolt $f$ to the desired position, and subsequently taking up the nut $f'$ to hold the teeth-bars rigid.

When the harrow is working in the bed, the sets of teeth-bars will be thrown upward above the horizontal plane, while when the harrow is working on the ridge the sets of teeth-bars will be depressed below a horizontal plane; and it will thus be seen that, as before stated, the harrow will work in either of these positions without altering the form of the ground.

I do not wish to be understood as confining myself exclusively to the precise details of construction above described, because various departures may be made with regard to such details without departing from the spirit of my invention.

Having thus described my invention, I claim—

1. The combination of a central beam, the side beams hinged to the central beam and carrying the teeth-beams which extend outwardly therefrom, the vertical guide affixed to the central beam, the brackets carried by the side beams, and the links connected to the brackets and the guide on the central beam, substantially as described, for the purpose set forth.

2. The combination of the central beam, the side beams hinged thereto and having the longitudinal slots $b'$ near their rear ends, the teeth-beams C, pivoted at their inner ends to each of the side beams, the longitudinal bars $C'$, connecting the teeth-beams, the diagonal links $C^2$, pivoted at their outer ends to the teeth-beams, and having the bolts $C^3$ at their inner ends, which pass through the slots $b'$ in the side beams, the vertical guide affixed to the central beam, and connections intermediate of the guide and side beams, substantially as described, for the purpose set forth.

3. The combination of the central beam, the side beams hinged thereto and carrying the teeth-beams, the vertical guide affixed to the central beam near the rear end thereof, the brackets affixed to the rear ends of the side beams and extending outwardly therefrom, and the links pivotally connected at their outer ends to the brackets, and adjustably connected at their inner ends to the fixed guide, substantially as described.

4. The combination of a central beam, the side beams hinged thereto and carrying the teeth-bars, the vertically-slotted guide affixed to the rear end of the central beam, the brackets secured to the rear end of the side beams and extending outwardly therefrom, the links pivotally connected at their lower ends to the brackets, and the bolt passing through the inner meeting ends of the links and the slot of the vertical guide, substantially as described, for the purpose set forth.

5. The combination, with the central beam, A, the side beams, B, pivoted thereto and provided with the slots $e'$, of the bars $c'$, connecting said teeth-bars, the links $c^2$, having bolts $c^3$ working in said slots, and nuts $c^4$ working upon the said bolt, the teeth-bars being pivotally connected to the side bars, substantially as described.

In testimony that I claim the foregoing as my own I have hereto affixed my signature in presence of two witnesses.

NICHOLAS CROMWELL ORRICK.

Witnesses:
E. W. EXUM,
C. C. GILLMOR.